US009614214B2

(12) United States Patent
Lee et al.

(10) Patent No.: US 9,614,214 B2
(45) Date of Patent: Apr. 4, 2017

(54) METHOD FOR IMPROVEMENT OF PERFORMANCE OF SI THIN FILM ANODE FOR LITHIUM RECHARGEABLE BATTERY

(75) Inventors: Sung-Man Lee, Chuncheon-si (KR); Seo-Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 2006 days.

(21) Appl. No.: 10/538,822

(22) PCT Filed: Dec. 16, 2004

(86) PCT No.: PCT/KR2004/003313
§ 371 (c)(1),
(2), (4) Date: Aug. 18, 2006

(87) PCT Pub. No.: WO2006/028316
PCT Pub. Date: Mar. 16, 2006

(65) Prior Publication Data
US 2007/0007239 A1    Jan. 11, 2007

(51) Int. Cl.
*H01M 4/04* (2006.01)
*H01M 4/134* (2010.01)
(Continued)

(52) U.S. Cl.
CPC ....... *H01M 4/0426* (2013.01); *H01M 4/0421* (2013.01); *H01M 4/134* (2013.01);
(Continued)

(58) Field of Classification Search
CPC ........ H01M 4/042; H01M 4/04; H01M 4/667; H01M 4/0421; H01M 4/0426;
(Continued)

(56) References Cited

U.S. PATENT DOCUMENTS 5,230,931 A * 7/1993 Yamazaki et al. ............. 427/569
6,063,142 A * 5/2000 Kawakami et al. ......... 29/623.5
(Continued)

FOREIGN PATENT DOCUMENTS

EP    1246278 A1    10/2002
JP    2000-113892   4/2000
(Continued)

OTHER PUBLICATIONS

Derwent Translation of JP 2000-336491.*
(Continued)

*Primary Examiner* — Stephen Yanchuk
(74) *Attorney, Agent, or Firm* — Birch, Stewart, Kolasch & Birch, LLP

(57) ABSTRACT

The present invention relates to a method for improving charge/discharge cycle characteristics of a lithium secondary battery using a Si based anode active material, the method comprising surface-treating a surface of an anode current collector to have specific morphology, and preferably vapor-depositing a silicon film, as the anode active material by sputtering under application of bias voltage to the surface-treated anode current collector, and/or disposing an adhesive layer between the surface-treated anode current collector and silicon film, so as to reinforce bondability between the anode current collector and active material, ultimately leading to improvement of charge/discharge characteristics of the battery.

5 Claims, 9 Drawing Sheets

(51) Int. Cl.
*H01M 4/66* (2006.01)
*H01M 4/64* (2006.01)
*H01M 4/38* (2006.01)
*H01M 10/052* (2010.01)
*H01M 4/02* (2006.01)

(52) U.S. Cl.
CPC ........... *H01M 4/661* (2013.01); *H01M 4/667* (2013.01); *H01M 4/38* (2013.01); *H01M 4/64* (2013.01); *H01M 10/052* (2013.01); *H01M 2004/027* (2013.01); *Y02E 60/122* (2013.01)

(58) Field of Classification Search
CPC ........ H01M 4/134; H01M 4/661; H01M 4/38; H01M 4/64; H01M 10/052; H01M 2004/027; H01B 13/00; B44C 1/22; Y02E 60/122
USPC .............................. 429/218.1; 29/730, 623.1
See application file for complete search history.

(56) References Cited

U.S. PATENT DOCUMENTS 7,410,728 B1 * 8/2008 Fujimoto et al. ............. 429/245
2002/0034687 A1 * 3/2002 Tamura et al. ........... 429/231.95
2004/0018424 A1 * 1/2004 Zhang et al. ................. 429/162
2005/0153208 A1 * 7/2005 Konishiike et al. .......... 429/245

FOREIGN PATENT DOCUMENTS

| JP | 2000-336491 | * 12/2000 |
| JP | 2002-260637 | 9/2002 |
| JP | 2002-313319 | 10/2002 |
| JP | 2003-7305 | 1/2003 |
| JP | 2003-17040 | 1/2003 |

OTHER PUBLICATIONS

English Translation (Machine) of JP 2000-336491.*
International Meeting on Lithium Batteries; "Cycle performance of Si-based Thin Film Anodes for Li-ion Batteries"; Authors: Kwan-Soo Lee, et al.; Thin Film & Battery Materials Lab., National Research Lab.; Kangwon National University; (14 pages).
PCT International Search Report; PCT International Application No. PCT/KR2004/003313; International Filing Date: Dec. 16, 2004; Date of Mailing: Apr. 27, 2005.

* cited by examiner

METHOD FOR IMPROVEMENT OF PERFORMANCE OF SI THIN FILM ANODE FOR LITHIUM RECHARGEABLE BATTERY

FIELD OF THE INVENTION

The present invention relates to a method for improving charge/discharge cycle characteristics of a lithium secondary battery using a Si based anode active material. More specifically, the present invention relates to a method for improving charge/discharge characteristics of a lithium secondary battery by surface-treating a surface of an anode current collector to have specific morphology, and preferably vapor-depositing a silicon film, as the anode active material by sputtering under application of bias voltage to the surface-treated anode current collector, and/or disposing an adhesive layer between the surface-treated anode current collector and silicon film, so as to reinforce bondability between the anode current collector and active material, ultimately leading to improvement of charge/discharge cycle characteristics of the battery.

BACKGROUND OF THE INVENTION

Technological development and increased demand for mobile instruments has lead to a rapid increase in the demand for secondary batteries as an energy source. Among these secondary batteries, a great deal of research and study has been focused on a lithium secondary battery having high energy density and discharge voltage and thus such lithium secondary batteries have been commercialized and entered wide use.

Recently, a great deal of attention has been directed to the lithium secondary battery using a Li—Si based active material as the anode. Pure silicon (Si) has theoretical specific capacity of 4200 mAh/g that is significantly greater than 372 mAh/g of graphite carbon. However, Si undergoes significant changes in volume thereof over continuous charge/discharge cycles, which causes mechanical and electrical degradation, and thus such poor charge/discharge cycle characteristics have been raised as the point at issue.

An attempt to solve such problems associated with charge/discharge cycle characteristics, some conventional arts have proposed a novel configuration of the electrode in which a surface of a copper current collector is made rough and an amorphous silicon film is vapor-deposited thereon. Such an electrode exhibits high reversible capacity of greater than 3000 mAh/g, but three still remains a need for further improvement of charge/discharge cycle characteristics thereof The reason of capacity decrease occurring in the course of the charge/discharge cycle is generally known to be due to loss of electrical contact between the silicon film and current collector. Therefore, if a method for improving electrical contact between the silicon film and current collector in the lithium secondary battery made up of the Li—Si based anode could be developed, it will be possible to manufacture a lithium secondary battery having excellent charge/discharge cycle characteristics.

SUMMARY OF THE INVENTION

Therefore, the present invention has been made in view of the above problems, and it is an object of the present invention to provide a method for improving charge/discharge cycle characteristics of a lithium secondary battery using a Si based anode active material.

The present inventors have conducted a variety of extensive and intensive study and experimentation to solve the most important problem as described above, that is, loss of electrical contact between a silicon film and anode current collector when charging/discharging, exhibited by the lithium secondary battery including the Si based anode active material. As a result of such extensive investigation, the inventors have found that when the anode current collector is treated to have specific surface morphology, the problem of electrical contact loss can be greatly improved, and further found that it is possible to remarkably improve charge/discharge cycle characteristics of the battery by applying bias voltage to the current collector, in the course of vapor-depositing the silicon film on the surface-treated anode current collector by sputtering, and/or disposing an adhesive layer between the anode current collector and silicon film. The present invention has been completed based on these findings.

Therefore, in the lithium secondary battery using the Si based anode active material, the method for improving charge/discharge cycle characteristics of the battery in accordance with the present invention comprises surface-treating the anode current collector such that the surface morphology of the anode current collector has grain boundaries of 5 to 100 μm in size throughout the entire surface of the anode current collector, and trenches having a depth of more than 1 μm formed at grain boundary junctions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
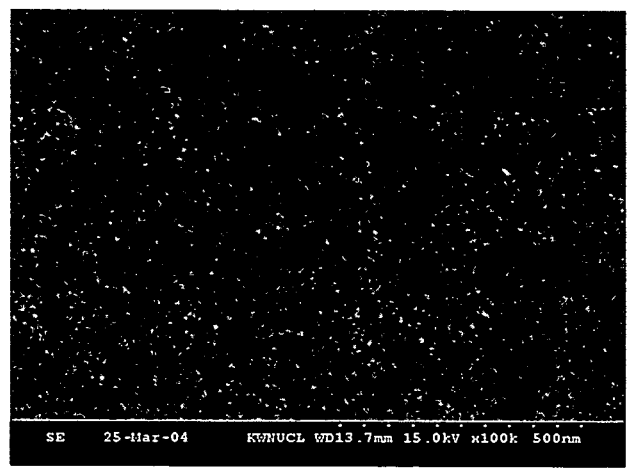
FIGS. 1 and 2 are, respectively, SEMs for a surface and vertical cross section of a silicon thin film vapor-deposited on a Si-wafer by sputtering, in Example 2.

The present inventors have confirmed through extensive experimentation that the anode current collector having the above-mentioned surface morphology provides, when vapor-depositing a silicon film on the surface thereof, remarkably increased adhesiveness between the silicon film and anode current collector, and thus exhibits minimal loss of electrical contact therebetween even though the silicon film, as the anode active material, undergoes significant changes in volume thereof, upon charging/discharging.

The anode current collector is fabricated to have a thickness of about 3 to 500 μm. There is no particular limit to anode current collectors, so long as they have conductivity without causing chemical changes in the battery of interest. As examples of anode current collectors, mention may be made of copper, nickel, stainless steel, aluminum, titanium, sintered carbon, copper or stainless steel surface-treated with carbon, nickel, titanium or silver, and an aluminum-cadmium alloy. Preferably, copper, nickel or stainless steel may be used as the anode current collector. The anode current collector may be used in various forms including films, sheets, foils, nets, porous structures, foams and non-woven fabrics.

Even though a method is known in the art of forming micro irregularities by surface-treating the surface of the anode current collector, there is no known example of improving charge/discharge cycle characteristics of the Si based anode active material by forming specific surface morphology as in the present invention. Further, when failing to obtain the surface morphology as achieved in the present invention, in spite of surface treatment to form micro irregularities according to conventional arts, it can be confirmed through the following Examples and Comparative Examples that charge/discharge cycle characteristics of the anode active material were deteriorated.

Preferably, the Si based anode active material may be amorphous silicon or nano crystalline silicon. In addition, in order to alleviate volume expansion of Si itself and improve electrical conductivity of silicon, other elements may be added to prepare the anode active material in the form of an alloy. As elements that can be added, mention may be made of for example, zirconium (Zr), titanium (Ti), iron (Fe), vanadium (V), cobalt (Co), nickel (Ni), copper (Cu), chromium (Cr), manganese (Mn), molybdenum (Mo), tantalum (Ta), tungsten (W), tin (Sn), silver (Ag) and aluminum (Al), which may used alone or in any combination thereof.

The size of the grain boundaries in the present invention is within the range of 5 to 100 μm, as described above. If the size of the grain boundaries is too small, this results in difficulty to induce formation of self-organized micro columnar structures through the grain boundaries, and thereby difficulty to disperse stress due to volume expansion of the anode active material resulting from a reaction of Li with Si. In contrast, if the size of the grain boundaries is too large, this may undesirably lead to deterioration of dispersion and alleviation effects of stress in the grain boundaries formed in a large size when the vapor-deposited anode active material reacts with Li.

In addition, the depth of trenches formed at the grain boundary junctions is greater than 1 μm, as described above. Where the depth of trenches is too shallow, this may undesirably lead to difficulty to induce cracking along trenches formed at the grain boundary junctions or difficulty to induce formation of self-organized micro columnar structure through the grain boundaries, in formation of cracks due to volume expansion of Si resulting from a reaction of Li and Si.

Various processes may perform the surface treatment of forming the above-mentioned specific morphology on the anode current collector surface. For example, mention may be made of chemical or electrical etching by a wet method, and reactive gas or ion etching by a dry method.

As an example, for performing chemical etching, when Cu or Ni is used as the anode current collector, a mixture of $FeCl_3/HCl/H_2O$ in the ratio of 1:8.5:33.7 (volume percent) is preferably used as an etchant. Etching time may vary depending upon various factors including kinds of anode current collectors and etchants, and thus may determined under conditions capable of forming the above-mentioned surface morphology, taking into account such factors.

An anode for the lithium secondary battery is prepared by vapor-depositing the silicon film, as the active material, on the anode current collector having such a surface morphology. Methods of vapor-depositing the silicon film include, but are not limited to, sputtering, LPCVD (Low Pressure Chemical Vapor Deposition), PECVD (Plasma Enhanced Chemical Vapor Deposition) and vacuum evaporation, for example. Preferably, sputtering may be used. The thickness of the silicon film is preferably within the range of 0.5 to 10 μm, in order to ensure suitable function as the anode active material.

As a preferred embodiment, when the silicon film is vapor deposited by sputtering, bias voltage may be applied to the anode current collector to further improve bondability between the silicon film and anode current collector. The bias voltage is preferably within the range of between about −25 V and −200 V.

Increased adhesiveness of the silicon film to the anode current collector by application of bias voltage upon sputtering may correlate with an enhanced intermixing reaction between the silicon film and anode current collector due to bombardment of energetic ions during sputtering under application of bias voltage.

As another preferred example, the anode structure may further comprise an adhesive layer on the interface between the silicon film and anode current collector. There is no particular limit to the thickness of the adhesive layer, so long as it does not have detrimental effects on functions of the anode. Preferably, the thickness of the adhesive layer is in the range of about 50 to 500 Å.

The present inventors have confirmed through extensive experimentation that the lithium secondary battery, which was configured using the anode having the adhesive layer disposed between the surface-treated anode current collector, as described above, and silicon film, forms unique surface morphology on the silicon film after several charge/discharge cycles. This is specifically illustrated in Example 4, which follows, and it is believed that such a phenomenon significantly improves charge/discharge cycle characteristics.

The adhesive layer is made of material having excellent chemical affinity for components of both the silicon film and anode current collector, without affecting anode functions. For example, when Cu or Ni is utilized as the anode current collector, the adhesive layer is particularly preferably a zirconium thin film.

As described above, the present invention achieves improving charge/discharge characteristics of a lithium secondary battery, comprising (a) surface-treating a surface of an anode current collector to form specific surface morphology, (b) preferably, applying bias voltage to the anode current collector when a silicon film is vapor-deposited on the surface-treated anode current collector by sputtering, or (c) forming an adhesive layer between the anode current collector and silicon film, so as to reinforce bondability between the silicon film and anode current collector, thus ultimately leading to improvement of charge/discharge cycle characteristics. However, it is true, of course, that better effects desired in the present invention can be achieved when all of the above-mentioned three requirements are satisfied.

If necessary, heat treatment may be performed to further enhance bondability between the anode current collector and adhesive layer, after formation of the adhesive layer on the anode current collector. The heat treatment induces interface reaction between the anode current collector and adhesive layer, whereby some ingredients of the anode current collector diffuse to the adhesive layer and conversely, some ingredients of the adhesive layer diffuse to the anode current collector, resulting in enhanced affinity leading to increased bondability. The heat treatment may be performed at a temperature of 100 to 400° C. for 10 sec to 30 min, for example.

In accordance with another aspect of the present invention, there is provided a lithium secondary battery comprising the anode treated or fabricated by the above-mentioned method, a cathode, a separator and a non-aqueous electrolyte containing a lithium salt.

The cathode is fabricated, for example, by applying a mixture of a cathode active material, a conductive agent and a binding agent to the cathode current collector, followed by drying. If necessary, a filling agent may be further added to the mixture.

The cathode current collector is generally fabricated to a thickness of 3 to 500 μm. This cathode current collector is not particularly limited, so long as it exhibits high conductivity without causing chemical changes in the concerned battery. For example, as the cathode current collector, mention may be made of stainless steel, aluminum, nickel, titanium, sintered carbon and, aluminum or stainless steel surface treated with carbon, nickel, titanium, silver, or the like. The current collector may be fabricated to have micro irregularities on the surface thereof so as to enhance adhesiveness to the cathode active material. In addition, the current collector may be made in various forms including films, sheets, foils, nets, porous structures, foams and non-woven fabrics.

Lithium transition metal oxides which can be used as the cathode active material in the present invention include, but are not limited to, layer-like compounds such as lithium cobalt oxide ($LiCoO_2$) and lithium nickel oxide ($LiNiO_2$) or compounds substituted with one or more transition metal; lithium manganese oxides such as a compound which is represented by the Formula $Li_{1+x}Mn_{2-x}O_4$ wherein x is between 0 an 0.33, $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; a Ni-site type lithium nickel oxide which is represented by Formula $LiNi_{1-x}M_xO_2$ wherein M is Co, Mn, Al, Cu, Fe, Mg, B or Ga, and x is between 0.01 and 0.3; lithium manganese composite oxides which are represented by Formula $LiMn_{2-x}M_xO_2$ wherein M is Co, Ni, Fe, Cr, Zn or Ta, and x is between 0.01 and 0.1, or Formula $Li_2Mn_3MO_8$ wherein M is Fe, Co, Ni, Cu or Zn; $LiMn_2O_4$ wherein a part of Li is substituted with alkaline earth metal ions; disulfide compounds; and $Fe_2(MoO_4)_3$.

The conductive agent utilized in the present invention is typically added in an amount of 1 to 50% by weight, based on the total weight of a mixture including the cathode active material. There is no particular limit to the conductive agent, so long as it has conductivity without causing chemical changes in the battery of interest. As examples of conductive agents, mention may be made of graphite such as natural or artificial graphite; carbon blacks such as carbon black, acetylene black, Ketjen black, channel black, furnace black, lamp black and thermal black; conductive fibers such as carbon fibers and metal fibers; carbon fluoride; metal powder such as aluminum or nickel powder, conductive whiskers such as zinc oxide and potassium titanate; conductive metal oxides such as titanium oxide; and conductive materials such as polyphenylene derivatives.

The binding agent is an ingredient assisting in bonding between the active material and conductive agent, and in binding to current collectors. The binding agent utilized in the present invention is typically added in an amount of 1 to 50% by weight, based on the total weight of a mixture including cathode active material. As examples of the binding agent, mention may be made of polyfluorovinylidene, a polyvinyl alcohol, carboxymethylcellulose (CMC), starch, hydroxypropylcellulose, recycled cellulose, polyvinyl pyrollidone, tetrafluoroethylene, polyethylene, polypropylene, an ethylene-propylene-diene terpolymer (EPDM), sulfonated EPDM, styrene butylene rubber, fluoro rubber and various copolymers.

The filling agent is an ingredient that inhibits cathode expansion and is optionally utilized. There is no particular limit to the filling agent, so long as it does not cause chemical changes in the battery of interest and is a fibrous material. As examples of the filling agent, there may be used olefin polymers such as polyethylene and polypropylene; and fibrous materials such as glass fiber and carbon fiber.

The separator is disposed between the anode and cathode. As the separator, an insulating thin film having high ion permeability and mechanical strength is used. The separator typically has a pore diameter of 0.01 to 10 μm and a thickness of 5 to 300 μm. As separators that can be used in the present invention, mention may be made of olefin polymers such as chemically resistant and hydrophobic polypropylene; and sheets or non-woven fabrics made of glass fiber or polyethylene. When a solid electrolyte such as a polymer is employed as the electrolyte, the solid electrolyte may also serve as both the separator and electrolyte.

The non-aqueous electrolyte containing lithium salt is composed of a non-aqueous electrolyte and lithium. As the non-aqueous electrolyte, a non-aqueous electrolyte solution, organic solid electrolyte and inorganic solid electrolyte may be utilized.

As the non-aqueous electrolyte solution, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphate polymers, poly agitation lysine, polyester sulfone, polyvinyl alcohol, poly(vinylidene fluoride), and polymers containing ionic dissociation groups.

As examples of the inorganic solid electrolyte utilized in the present invention, mention may be made of nitrides halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlC$_4$, CH$_3$SO$_3$Li, CF$_3$SO$_3$Li, (CF$_3$SO$_2$)$_2$NLi, lithium chloroborate, lower aliphatic carboxylic acid lithium, lithium tetraphenyl borate and imide.

Additionally, in order to improve charge/discharge characteristics and flame retardancy, for example, pyridine, triethylphosphite, triethanol amine, cyclic ester, ethylene diamine, n-glyme, hexamethylphosphoric triamide, nitrobenzene derivatives, sulfur, quinone-imine dye, n-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. In addition, the non-aqueous electrolyte may further contain carbon dioxide gas, in order to improve high temperature preservability.

As described above, illustrative description was provided on constitutive components of the battery that can be configured using the aluminum based-cathode current collector in accordance with the present invention, but if necessary, some of constitutive components may be excluded or substituted or other constitutive components may be further added.

DESCRIPTION OF THE PREFERRED EMBODIMENTS

Now, the present invention will be described in more detail with reference to the following Examples. These examples are provided only for illustrating the present invention and should not be construed as limiting the scope and sprit of the present invention.

EXAMPLE 1

FeCl$_3$ was mixed to a final concentration of 0.4 M in an aqueous 2.4 M HCl solution to prepare an etching solution that was then used in surface treatment by etching the surface of a Ni foil for about 1 min. On the surface treated-Ni foil current collector, a Si thin film of 5000 Å thickness was formed from a Si target having a diameter of 2" (99.99%) by R.F. magnetron sputtering. Sputtering was performed in a chamber which had been vacuum pumped to 2×10$^{-6}$ Torr and then set to 5 mTorr by injection of argon gas.

In order to confirm electrochemical properties of the Si thin film electrode, two #2016 coin cell batteries were prepared using a pure Li foil as a cathode, and a mixed solution in which 1M LiPF$_6$ was added to a mixed solvent of ethylene carbonate (EC) and diethylene carbonate (DEC) (volume ratio 1:1), as an electrolyte solution. These cell batteries were assembled in a globe box under argon atmosphere, and were then subjected to more than 30 charge/discharge experiments at 0 to 1.2 V using current of 100 μA/cm$^2$ at 30° C. Results thus obtained confirmed that the batteries exhibited excellent charge/discharge cycle characteristics.

EXAMPLE 2

In order to confirm effects due to application of bias voltage during sputtering, the following experiments were performed: Experiment A; vapor-deposition of a Si thin film on a Si-wafer by sputtering, and Experiment B; vapor-deposition of the Si thin film on the Si-wafer by sputtering while applying DC bias voltage of -100 V.

Figure 2:
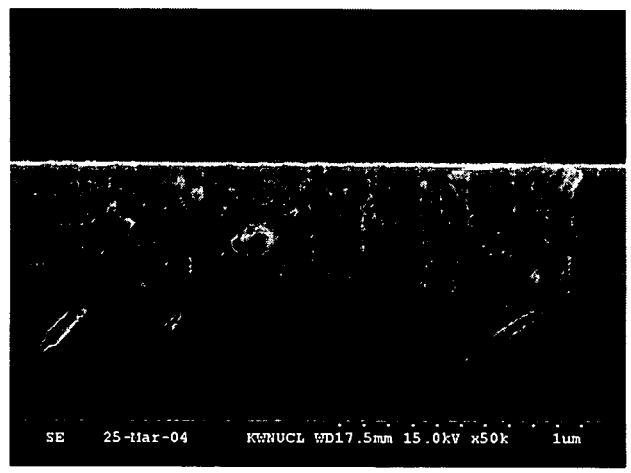
Figure 3:
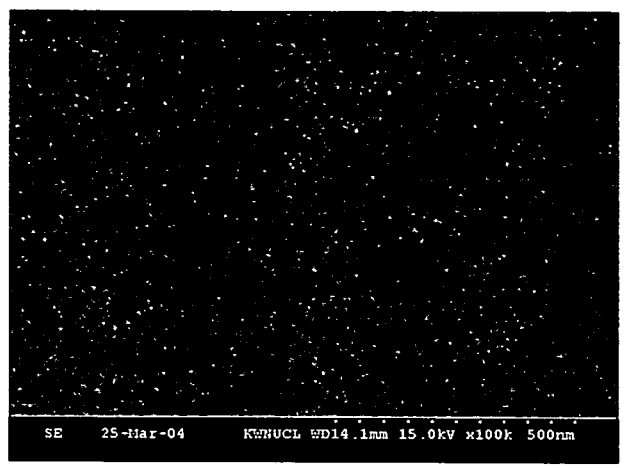
FIGS. 3 and 4 are, respectively, SEMs for surface and vertical cross section of a silicon thin film vapor-deposited on a Si-wafer by applying bias voltage upon sputtering, in Example 2.
Figure 4:
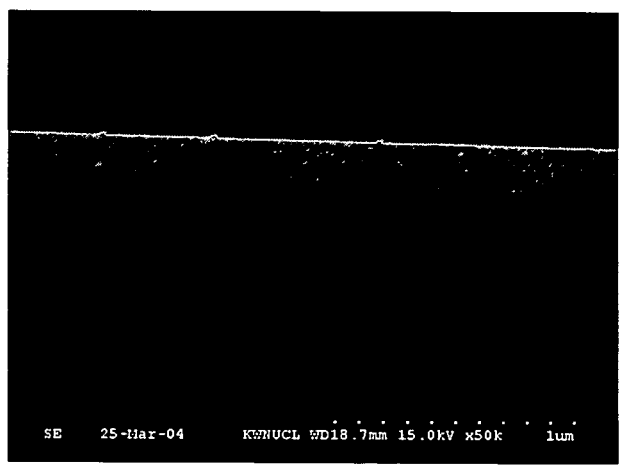

FIGS. 1 and 2 show SEMs of the surface (FIG. 1) and vertical cross-section (FIG. 2) of the Si thin film obtained in Experiment A, respectively. FIGS. 3 and 4 show SEMs of the surface (FIG. 3) and vertical cross-section (FIG. 4) of the Si thin film obtained in Experiment B, respectively.

The Si thin film in Experiment A revealed a columnar structure having rough surface morphology and cross section, while the Si thin film in Experiment B revealed a smoother vapor-deposition surface due to application of bias voltage.

Figure 5:
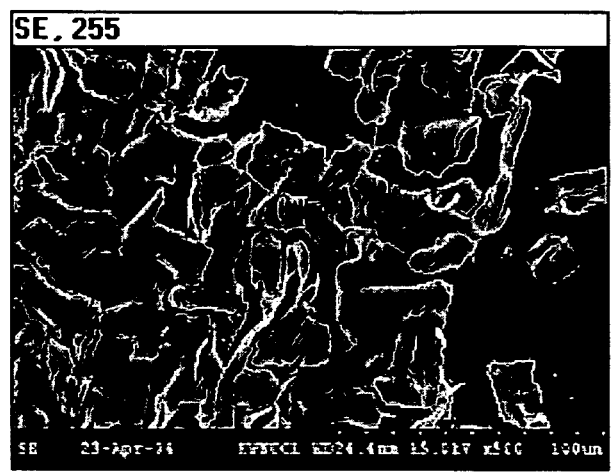
FIGS. 5 and 6 are, respectively, SEMs for surface of a silicon thin film vapor-deposited on a Ni foil, in Example 2.
Figure 6:
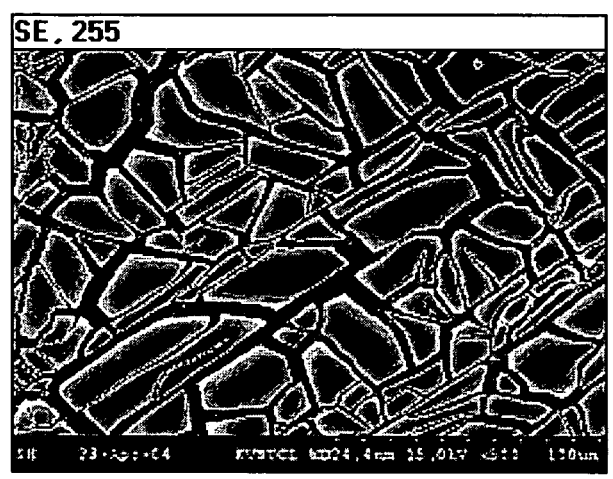
Figure 7:
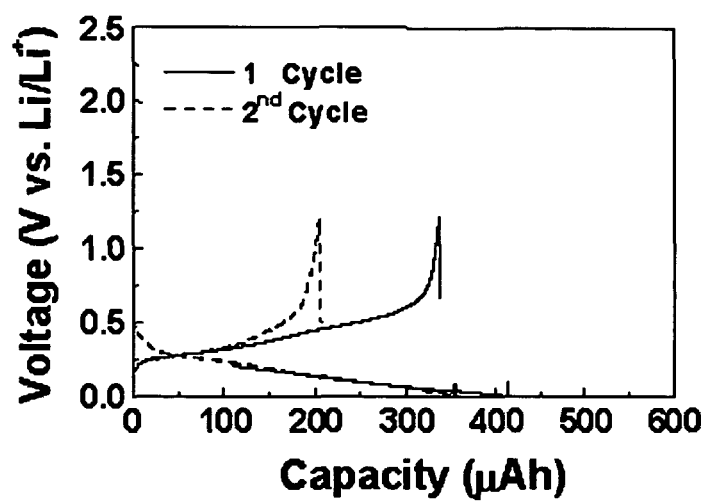
FIGS. 7 and 8 are, respectively, graphs showing charge/discharge profiles of a lithium secondary battery, in Example 2.
Figure 8:
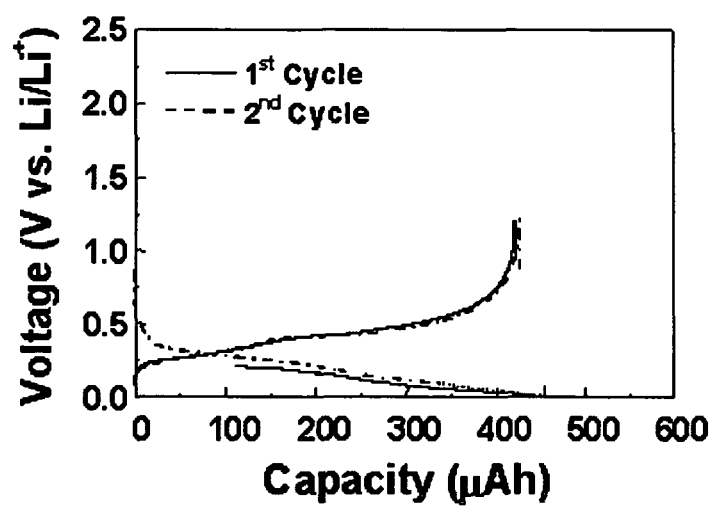

These Si thin films were subjected to charge/discharge experiments as in Example 1. FIG. 5 shows an SEM of the surface of the Si thin film after one charge/discharge cycle (Experiment A) and FIG. 7 is a graph showing the charge/discharge profile thereof. Meanwhile, FIG. 6 shows an SEM of the surface of the Si thin film after one charge/discharge cycle (Experiment B) and FIG. 8 is a graph showing charge/discharge profile thereof. Comparing these results, the lithium secondary battery utilizing the Si thin film in Experiment B exhibited relatively low initial irreversible capacity and relatively high charge/discharge cycle characteristics, as shown in FIG. 8. Surmising from SEMs in FIGS. 5 and 6, it seems that such results are due mainly to increased adhesiveness of the Si thin film by application of bias voltage.

EXAMPLE 3

Instead of a Ni foil, a Cu foil was surface-treated using the same procedure as in Example 1, and the experiment was repeated by applying DC bias voltage of -100 V using the same procedure as in Example 2.

Figure 9:
FIGS. 9 through 12 are, respectively, SEMs for surfaces of Cu foils, in Example 3 and Comparative Examples 1 through 3.
Figure 13:
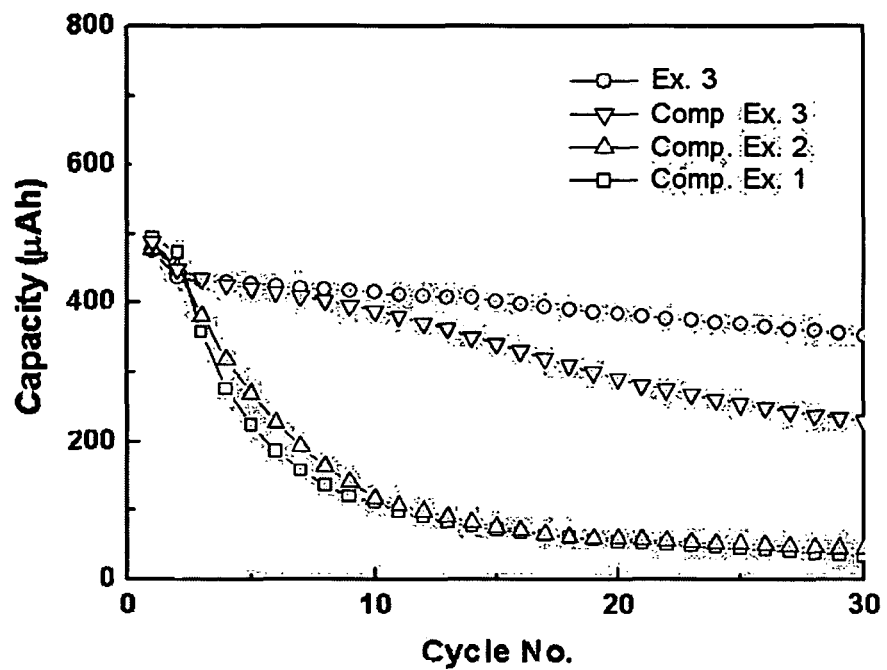
FIG. 13 is a graph showing charge/discharge cycle characteristics of lithium secondary batteries prepared in Example 3 and Comparative Examples 1 through 3.

FIG. 9 shows an SEM of the surface of the etched Cu foil, and FIG. 13 is a graph showing charge/discharge cycle characteristics of the battery fabricated using this Cu foil.

COMPARATIVE EXAMPLES 1-3

Experiments were repeated using the same procedure as in Example 3, except that etching was not performed (Comparative Example 1), or etching solutions listed in Table 1 below were used instead of the FeCl$_3$/HCl/H$_2$O etching solution and etching time was varied (Comparative Examples 2 and 3).

TABLE 1

|  | Etching Solution | Etching Time | SEM of Surface |
|---|---|---|---|
| Ex. 3 | FeCl$_3$ + HCl + H$_2$O | 1 min | FIG. 9 |
| Comp. Ex. 1 | — | 0 | FIG. 10 |
| Comp. Ex. 2 | HNO$_3$ + H$_2$O | 3 min | FIG. 11 |
| Comp. Ex. 3 | FeCl$_3$ + H$_2$O | 5 min | FIG. 12 |

Figure 10:
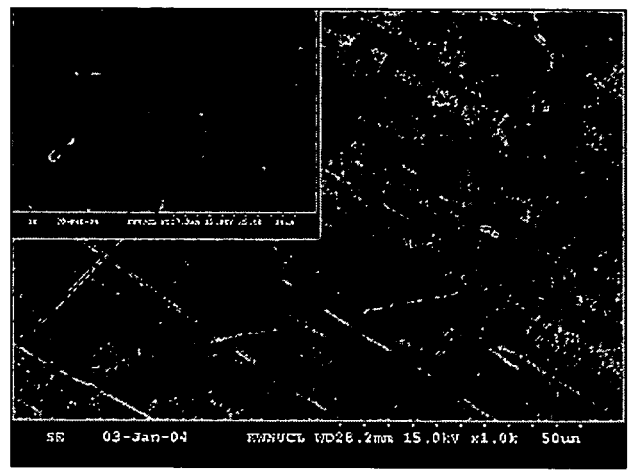
Figure 11:
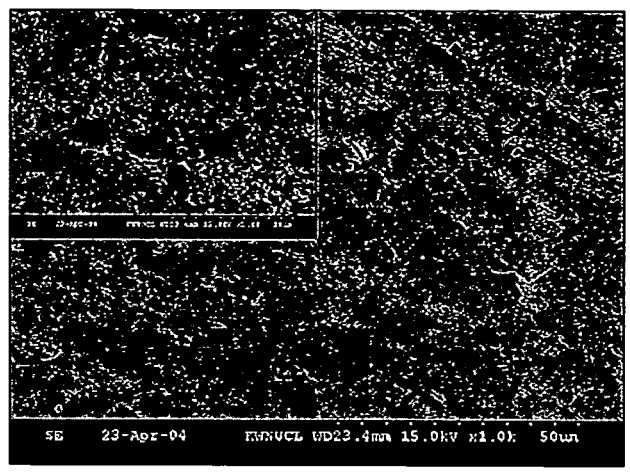
Figure 12:
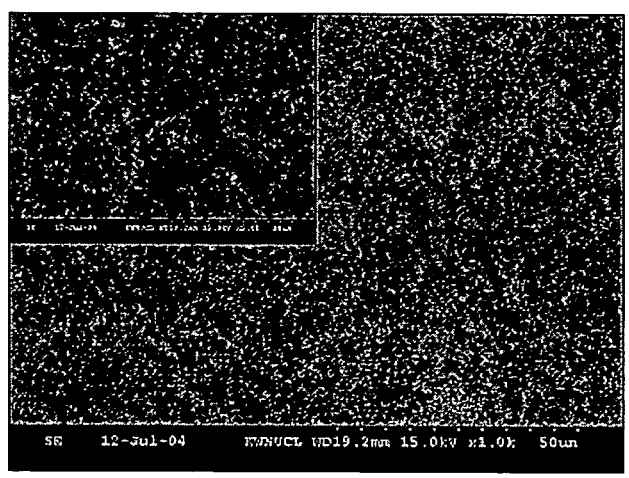

FIGS. 10 through 12 show SEMs of respective surfaces of the etched Cu foils. It is noteworthy that the Cu foil in Example 3 exhibited surface morphology (FIG. 9) significantly distinctive from those of Comparative Examples 1 through 3 (FIGS. 10 through 12). That is, it was confirmed that the surface of the Cu foil in Example 3 revealed relatively broadly and deeply developed grain boundaries.

FIG. 13 is a graph showing charge/discharge cycle characteristics of batteries in Comparative Examples 1 through 3, together with results obtained in Example 3. It can be seen from these results that charge/discharge cycle characteristics of batteries showed close relationship with surface morphology of the Cu base material, and the battery in Example 3 exhibited particularly excellent results.

Effects of surface roughness of the Cu base on improvement of charge/discharge cycle characteristics were caused by formation of a micro columnar structure during charging/discharging of the battery. Relevant surface-treatment of the Cu base by etching provides a Si thin film having an excellent self-organized micro columnar structure, and thus reduces stress and tension caused by changes in volume during charge/discharge cycle of the battery. Therefore, as shown in FIG. 13, the battery in Example 3 exhibited excellent capacity preservability compared to batteries in Comparative Examples 1 through 3.

EXAMPLE 4

The experiment was repeated using the same procedure as in Example 3, except that, on the surface of the Cu foil etched in Example 3, a Si thin film was vapor-deposited following vapor-deposition of a Zr layer of 100 Å thickness by application of DC bias voltage of −100 V to a substrate using R.F. magnetron sputtering.

Figure 14:
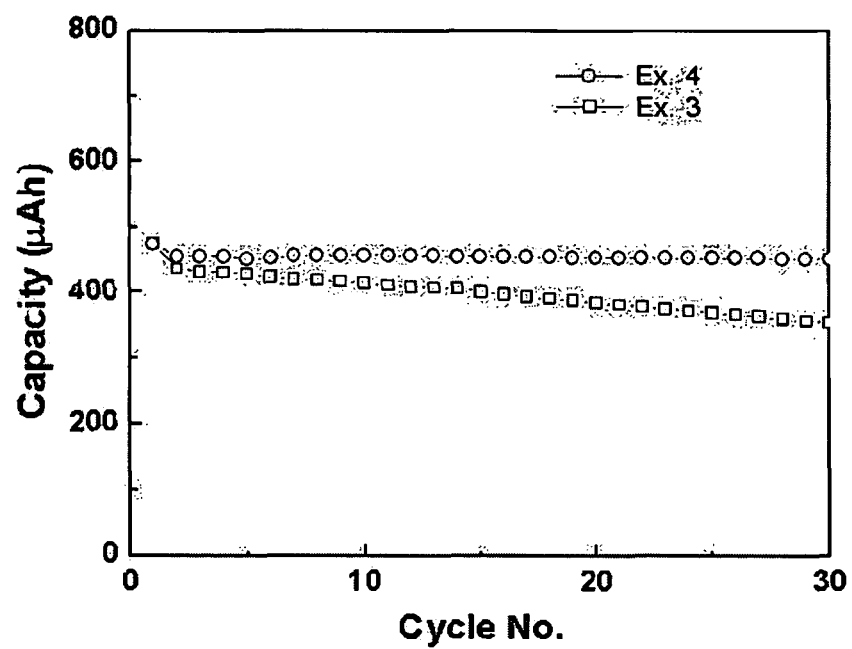
FIG. 14 is a graph showing charge/discharge cycle characteristics of a lithium secondary battery, in Example 4.

FIG. 14 is a graph showing charge/discharge cycle characteristics of the battery prepared in Example 4, together with results obtained in the battery of Example 3. As can be seen from FIG. 14, interposition of the Zr layer between the Cu foil and Si thin film further improved charge/discharge cycle characteristics of battery.

Figure 15:
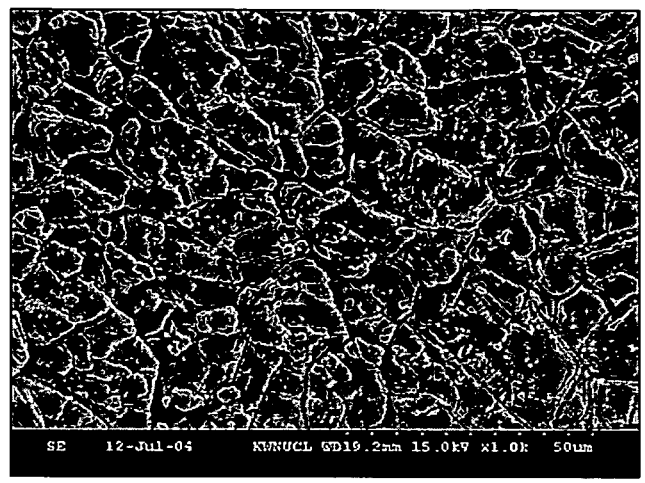
FIGS. 15 and 16 are, respectively, SEMs for surface of a silicon thin film, after 1 and 18 times of charge/discharge cycles in Example 4.
Figure 16:
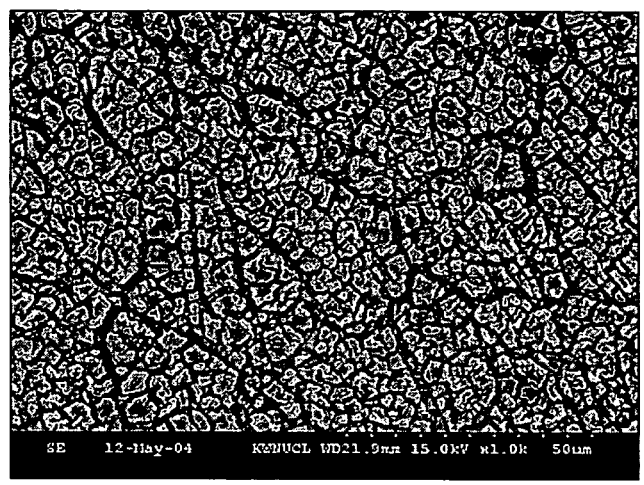
Figure 17:
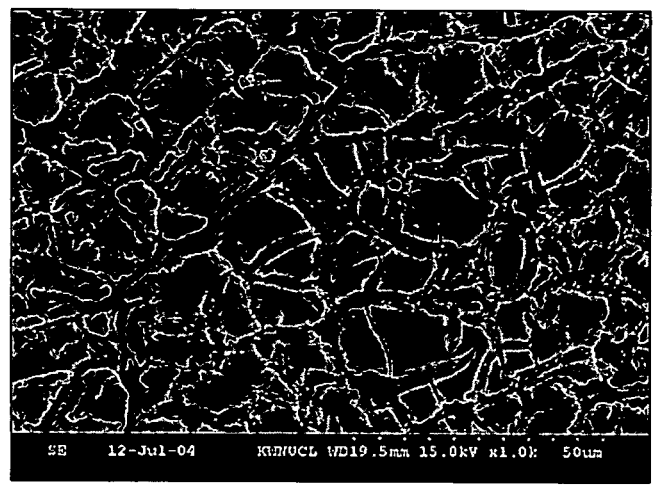
FIGS. 17 and 18 are, respectively, SEMs for surface of a silicon thin film, after 1 and 18 charge/discharge cycles in Example 3.
Figure 18:
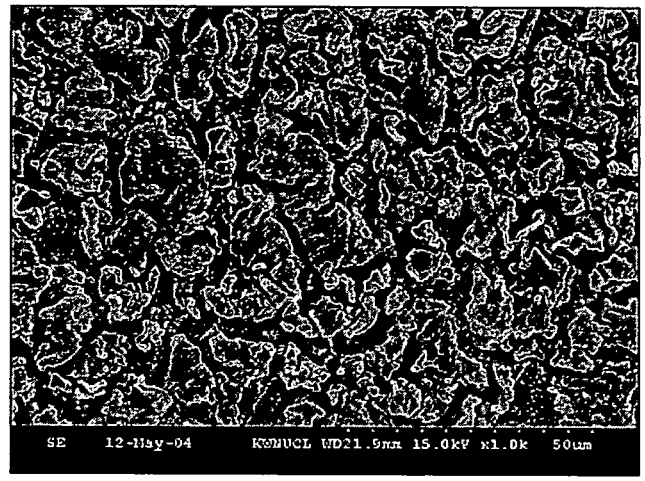

FIGS. 15 and 16 show, respectively, SEMs of the Si thin film, after 1 and 18 charge/discharge cycles in the battery of Example 4. In contrast with these results, FIGS. 17 and 18 show, respectively, SEMs of the Si thin film, after 1 and 18 charge/discharge cycles in the battery of Example 3. Upon comparing FIG. 16 with FIG. 18, it was confirmed that both electrodes in Examples 3 and 4 exhibited formation of cracks after 18 charge/discharge cycles, but there were significant structural differences therebetween. That is, FIG. 16 exhibited formation of wide gaps along grain boundary profile of the Cu base, as shown in FIG. 1 and also formation of narrow gaps within a plurality of islands surrounded by such wide gaps, thus showing generally a structure in which micro islands having a small and uniform size were formed by narrow gap. The thus-formed micro columnar structure was proven to be stable during charge/discharge cycles, as shown in FIG. 14. This was possible because interposition of the Zr layer, as the adhesive layer, between the Cu current collector and Si thin film strengthened adhesiveness of Si to the Cu base. In comparison with this result, FIG. 18 exhibited randomized distribution of islands and cracks, and a structure of islands having a relatively larger size. Further, it was also confirmed that some islands were separated from the Cu base. Therefore, it can be seen that introduction of the Zr adhesive layer to the interface between the Si thin film and Cu base could completely resolve the problem associated with gradual decrease of battery capacity occurring during charge/discharge cycles.

As described above, in accordance with the method of the present invention, it is possible to prepare a lithium secondary battery having excellent charge/discharge cycle characteristics by reinforced bondability between the silicon film, as the anode active material and current collector, and thereby minimization of loss of electrical contact in the course of a charge/discharge process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for improving charge/discharge cycle characteristics of a lithium secondary battery using a Si based anode active material, the method comprising:
   surface-treating an anode current collector composed of Cu with a chemical etching mixture of $FeCl_3/HCl/H_2O$ until trenches having a depth of more than 1 μm is formed at the grain boundary junctions such that the surface morphology of the anode current collector has grain boundaries of 5 to 100 μm size throughout an entire surface of the anode current collector, and wherein the surface-treating is performed by chemical etching to form a surface-treated anode current collector;
   depositing a metallic zirconium thin film on the surface-treated anode current collector to form an adhesive layer, wherein the adhesive layer is a separate and distinct layer located between the anode current collector and the Si based anode active material;
   vapor-depositing a silicon film on the adhesive layer while applying a bias voltage to the anode current collector to form an anode; and
   heat-treating the anode, wherein the heat-treating increases a bond between the adhesive layer and the surface-treated anode current collector,
   wherein the bias voltage is a DC bias voltage of between about −25V and −200V, and
   wherein a thickness of the metallic zirconium thin film is in a range of 50 to 500 Å.

2. The method as set forth in claim 1, wherein upon vapor-depositing the silicon film, as the anode active material, on the surface-treated anode current collector by sputtering, the bias voltage applied to the anode current collector further improves bondability between the silicon film and anode current collector.

3. The method as set forth in claim 1, wherein after formation of the adhesive layer on the surface-treated anode current collector, the silicon film, as the anode active material, is vapor-deposited on the adhesive film by sputtering, under application of the bias voltage to the anode current collector.

4. The method as set forth in claim 1, wherein the heat treatment is performed at a temperature of 100 to 400° C. for 10 sec to 30 min.

5. The method as set forth in claim 3, wherein heat treatment is performed to further enhance bondability between the anode current collector and adhesive layer, after formation of the adhesive layer on the anode current collector.

* * * * *